Nov. 11, 1930.  B. DARROW  1,781,273
WHEEL ASSEMBLY
Filed Dec. 20, 1927
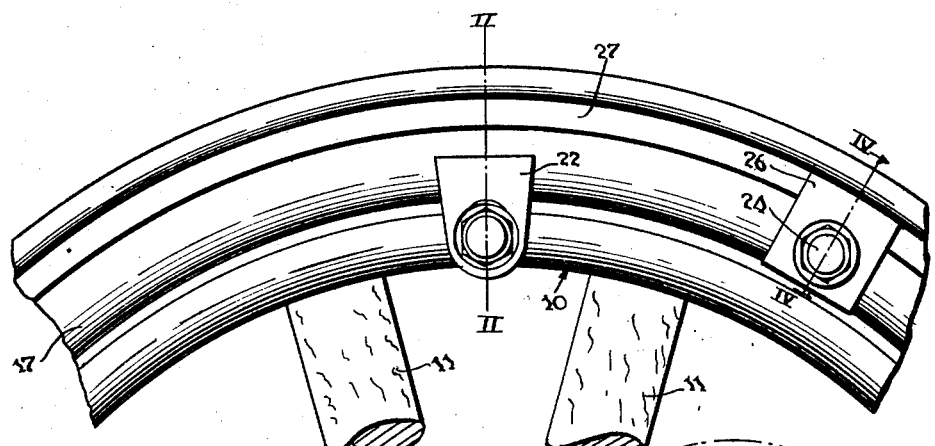
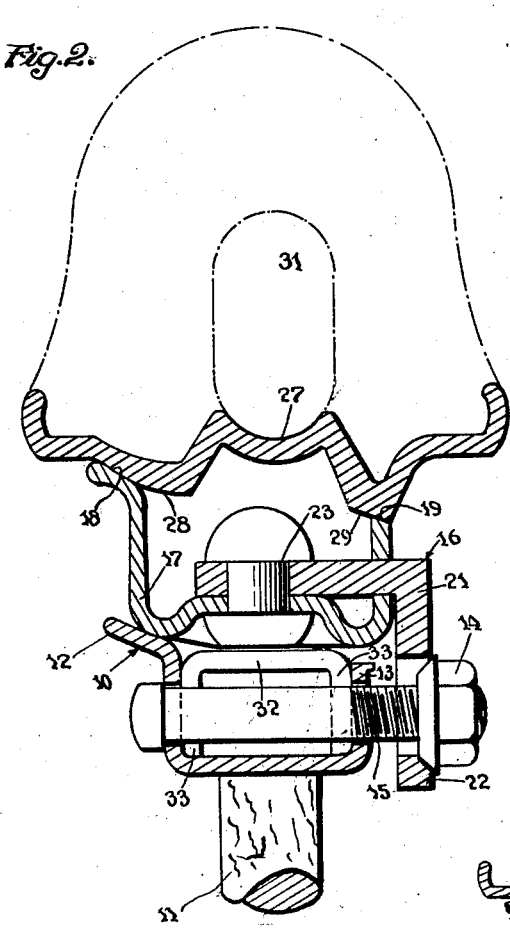
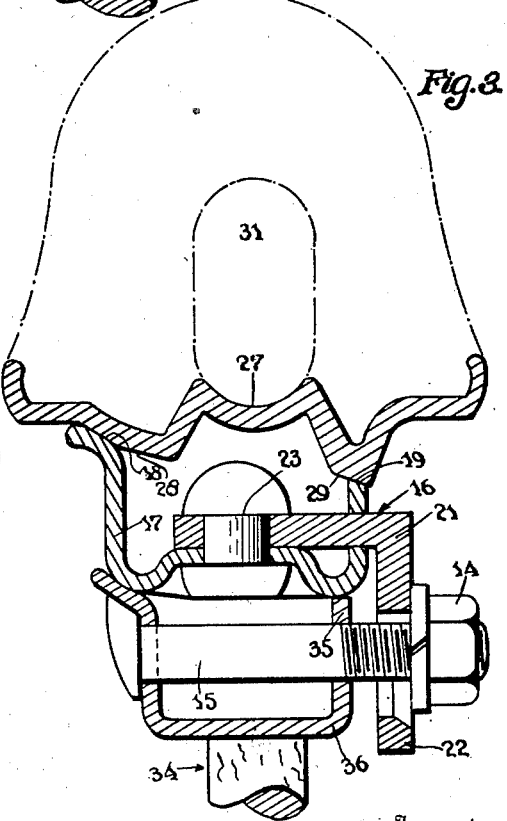
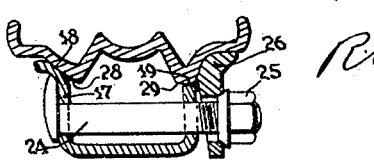
Inventor
Burgess Darrow.
Attorney Patented Nov. 11, 1930

1,781,273

UNITED STATES PATENT OFFICE

BURGESS DARROW, OF AKRON, OHIO, ASSIGNOR TO THE GOODYEAR TIRE & RUBBER COMPANY, OF AKRON, OHIO, A CORPORATION OF OHIO

WHEEL ASSEMBLY

Application filed December 20, 1927. Serial No. 241,323.

This invention relates to wheel assemblies and it has particular relation to wheel assemblies permitting ready substitution of a cushion tire for a pneumatic tire and rim without alteration of the diameter of the assembly.

Since the advent of balloon tires, smaller wheels are necessarily employed on all standard makes of automobiles. It is no longer practicable, therefore, to substitute solid or cushion tires of the same size as the pneumatic tires to be replaced, by reason of the large amount of rubber required to produce such tires. Although various forms of adapters have been proposed for disposition between a cushion tire and a wheel felloe adapted normally to support a pneumatic tire and rim, none of them is wholly satisfactory in use.

One object of this invention is to provide an adapter whereby standard cushion tires may be secured demountably upon standard wheels designed normally to support demountable rims carrying pneumatic tires.

Another object of the invention is to provide an adapter whereby cushion tires of a single standard size may be employed selectively with standard felloes of different diameters.

A further object of the invention is to provide a wheel assembly including a felloe adapted to support demountably a rim and a pneumatic tire, having a cushion tire, equal in diameter to the pneumatic tire, supported demountably thereon.

The invention also involves certain novel elements and features of construction to be pointed out hereinafter.

For a better understanding of the invention, reference may now be had to the accompanying drawing forming a part of the disclosure, wherein;

Figure 1 is a fragmentary side elevational view of a portion of a wheel assembly embodying the features of the invention;

Figure 2 is a transverse sectional view, taken substantially along the line II—II of Figure 1;

Figure 3 is a similar view illustrating the invention as applied to a different form of wheel; and Figure 4 is a transverse sectional view taken substantially along the line IV—IV of Figure 1.

The wheel assembly constituting the subject matter of this application was devised primarily to provide means whereby a single size of standard cushion tire might be applied selectively to the standard felloes of wheels of different sizes employed in automobiles, for example of the Ford or of the Chevrolet type, to replace the pneumatic tires commonly used thereon.

Figures 1, 2 and 4 of the drawing illustrate the invention as applied to a standard Ford wheel. This type of wheel comprises a channel-shaped felloe 10 connected to a hub (not shown) by means of spokes 11. One side of the felloe is laterally flared, as indicated at 12, to provide a rim seating surface and the other side 13 is adapted to be engaged at its outer end by the usual clamping lugs (not shown), which are adapted to be forced into engagement with the rim by means of nuts 14 threaded on bolts 15 traversing the felloe at spaced points.

An adapter 16, comprising an annular channel-shaped member 17 provided with seating faces 18 and 19 at opposite sides thereof, is designed to fit upon the flared portion 12 of the felloe and to be removably secured in position upon the latter by means of angular lugs 21 which include depending apertured portions 22 designed to coact with the bolts 15 and nuts 14. The lugs 21 preferably extend through one side of the member 17 and are riveted, as indicated at 23, or otherwise secured to the center of the member 17.

Bolts 24 traversing the side walls of the member 17 midway between the lugs 21 have nuts 25 threaded thereon for engagement with clamping lugs 26 which serve to secure a tire band 27 upon the element 17. It is to be noted that the band 27 is formed with seating faces 28 and 29 for coaction with the seating faces 18 and 19, respectively, of the member 17. The band 27 supports a cushion tire 31, as indicated in broken lines in Figure 2 of the drawings, in the usual manner.

Auxiliary supporting members 32 of U-shape are disposed within the channel of the felloe 10 in alignment with the bolts 15 as well as at intervals between the bolts to aid in supporting the element 17 in the desired position upon the felloe. The members 32 are preferably formed of spring metal with the arms 33 thereof in slightly diverging relation in order that they will remain within the channel of the felloe after they are sprung into position therein. Those members 32 which are designed to be positioned in alignment with the bolts 15 are of course slotted to accommodate the bolts.

Figure 3 of the drawings illustrates a cushion tire 31 demountably positioned upon a standard Chevrolet wheel 34, by means of the same form of adapter element 17. In this embodiment of the invention the elements 32 are not necessary, although they may be used if desired. Since the side 35 of the felloe 36 of this type of wheel is designed to engage directly with the rim of a pneumatic tire positioned thereon, rather than to engage tapered lugs as utilized in the Ford construction, this side engages directly with the element 17 which obviates the necessity of employing the auxiliary members 32.

From the foregoing description it is apparent that a simple adapter has been provided whereby the same cushion tire of standard form may be selectively employed with standard wheels of different sizes designed to support pneumatic tire rims demountably. The expression, cushion tire, in this specification is intended to designate the well known type of tire composed of a metallic band having a cushion tread or a solid tread secured thereto.

Although I have illustrated only two embodiments of the invention and have described those embodiments in detail, it will be apparent to those skilled in the art that the invention is not so limited, but that various minor modifications may be made therein without departing from the spirit of the invention or from the scope of the appended claims.

What I claim is:

1. A wheel assembly including a felloe of channel shape open to the radially outer side of the wheel, the inner leg of the felloe having a flared outer edge portion to provide an inclined seat, an adapting member of channel shape having its base seated on the flared edge of the inner leg of the felloe, and its legs projecting radially outwardly from the base, the inner leg of the adapting member terminating in an inclined portion, a solid tire base seated on the legs of the adapting member, clamping means cooperating with the adapting member and tire base for securing the latter on the former, and clamping means cooperating with the felloe and adapting member for securing the latter on the former, said last mentioned clamping means comprising an axially directed bar extending through the outer leg of the adapting member and rigidly secured to the outer surface of the base of such adapting member, said bar at the outer side of the adapting member having a radially inwardly projecting portion secured by bolts to the felloe.

2. A wheel assembly including a felloe of channel shape open to the radially outer side of the wheel, the inner leg of the felloe having a flared outer edge portion to provide an inclined seat, an adapting member of channel shape having its base seated on the flared edge of the felloe and its legs projecting radially outwardly from the base, the inner leg of the adapting member terminating in an inclined portion, a solid tire base seated on the legs of the adapting member, clamping means cooperating with the adapting member and tire base for securing the latter on the former, and clamping means cooperating with the felloe and adapting member for securing the latter on the former, said last mentioned clamping means comprising a member extending through the outer leg of the felloe and rigidly secured to the outer peripheral surface of the base of the adapting member, and also demountably secured to the felloe.

In witness whereof, I have hereunto signed my name.

Signed at Akron, in the county of Summit, and State of Ohio, this 19th day of December, 1927.

BURGESS DARROW.